(12) United States Patent
Abbas

(10) Patent No.: US 9,987,977 B2
(45) Date of Patent: Jun. 5, 2018

(54) VEHICULAR CONTROL MODE SIGNALING SYSTEM

(71) Applicant: Zeyad S Abbas, Lake Mary, FL (US)

(72) Inventor: Zeyad S Abbas, Lake Mary, FL (US)

( * ) Notice: Subject to any disclaimer, the term of this patent is extended or adjusted under 35 U.S.C. 154(b) by 0 days. days.

(21) Appl. No.: 15/351,709

(22) Filed: Nov. 15, 2016

(65) Prior Publication Data
US 2017/0158116 A1 Jun. 8, 2017

Related U.S. Application Data

(60) Provisional application No. 62/262,013, filed on Dec. 2, 2015.

(51) Int. Cl.
*B60Q 1/50* (2006.01)
*H04L 9/00* (2006.01)

(52) U.S. Cl.
CPC ........................... *B60Q 1/50* (2013.01)

(58) Field of Classification Search
CPC ....................................................... B60Q 1/50
USPC ............................................................ 701/36
See application file for complete search history.

(56) References Cited

U.S. PATENT DOCUMENTS

| | | | | |
|---|---|---|---|---|
| 7,893,822 B2* | 2/2011 | Gerber | ............ | B60Q 1/503 180/65.235 |
| 8,212,666 B2* | 7/2012 | Meurle | ............ | B60K 6/365 340/463 |
| 8,525,660 B2* | 9/2013 | Miller | ............ | B60Q 1/0088 340/468 |
| 8,643,505 B2* | 2/2014 | Tsuda | ............ | B60Q 1/2611 340/435 |
| 8,653,960 B2* | 2/2014 | Hanna | ............ | B60W 10/26 340/441 |
| 9,141,109 B1 | 9/2015 | Kamata | | |
| 2006/0125615 A1* | 6/2006 | Song | ............ | B60Q 1/44 340/463 |

OTHER PUBLICATIONS

'U.S. Department of transportation Releases Policy on Automated Vehicle Development'; NHTSA; May 30, 2013; 2 pages.

\* cited by examiner

*Primary Examiner* — Tan Q Nguyen
(74) *Attorney, Agent, or Firm* — Jason T Daniel, Esq; Daniel Law Office, P.A.

(57) ABSTRACT

A vehicular control mode signaling system includes a Driving Automation Level Electronic Control Unit that is communicatively linked to a vehicle computer and a signaling unit that is disposed along the vehicle. The control unit includes a processor, a vehicle controller, an interface controller, and a memory. The processor determines a vehicular control mode based on a comparison of a stored automation nomenclature and operating information received from the vehicle computer. The signaling unit includes at least one signal light that is disposed along the vehicle, and a transmitter that are selectively activated by the processor based on the determined vehicular control mode.

14 Claims, 3 Drawing Sheets

VEHICULAR CONTROL MODE SIGNALING SYSTEM

CROSS-REFERENCE TO RELATED APPLICATIONS

This application claims the benefit of U.S. Application Ser. No. 62/262,013 filed on Dec. 2, 2015, the contents of which are incorporated herein by reference.

TECHNICAL FIELD

The present invention relates generally to automated systems, and more particularly to a system for providing visual and/or electronic notifications regarding a control status of an automated or semi-automated vehicle.

BACKGROUND

The statements in this section merely provide background information related to the present disclosure and may not constitute prior art.

Vehicle automation is the use of computer based control systems to augment or replace human input to operate a vehicle. The need for such systems is exemplified by our overburdened highway systems, where the differences in human reaction time cause sluggish traffic and deadly accidents each and every day.

In recent years, automobile manufacturers have begun incorporating many semi-autonomous features into their new vehicle offerings, such as brake assist, forward collision avoidance, lane departure warnings and adaptive cruise control, for example, with the goal of creating commercially viable automobiles that can operate in a sustained and fully automated capacity. Although this progress will undoubtedly lead to a safer transport system one day in the future, the transition period between no automation, semi-automation and fully autonomous vehicles will undoubtedly lead to situations where someone will question exactly who or what is controlling a particular vehicle at a given time.

Accordingly, it would be beneficial to provide a vehicular control mode signaling system that can provide a visual and/or electronic notification regarding whether a vehicle is under manual, semi-automated or fully automated control. It would also be beneficial if this notification conformed to an industry and/or government standard.

SUMMARY OF THE INVENTION

The present invention is directed to a vehicular control mode signaling system. One embodiment of the present invention can include a Driving Automation Level Electronic Control Unit that is communicatively linked to a vehicle computer and a signaling unit that is disposed along the vehicle. The control unit can include a processor for controlling an operation of the control unit, and a memory for storing operating instructions for the processor to execute.

In one embodiment, the memory of the system can be loaded with an industry standard automation nomenclature for allowing the processor to determine a vehicular control mode at any given time. The determination can be based on a comparison of the stored nomenclature with operating information received from the vehicle computer.

In one embodiment, the signaling unit can include at least one signal light that is disposed along the vehicle, and a transmitter. The signal light and transmitter can be selectively activated by the processor based on the determined vehicular control mode.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
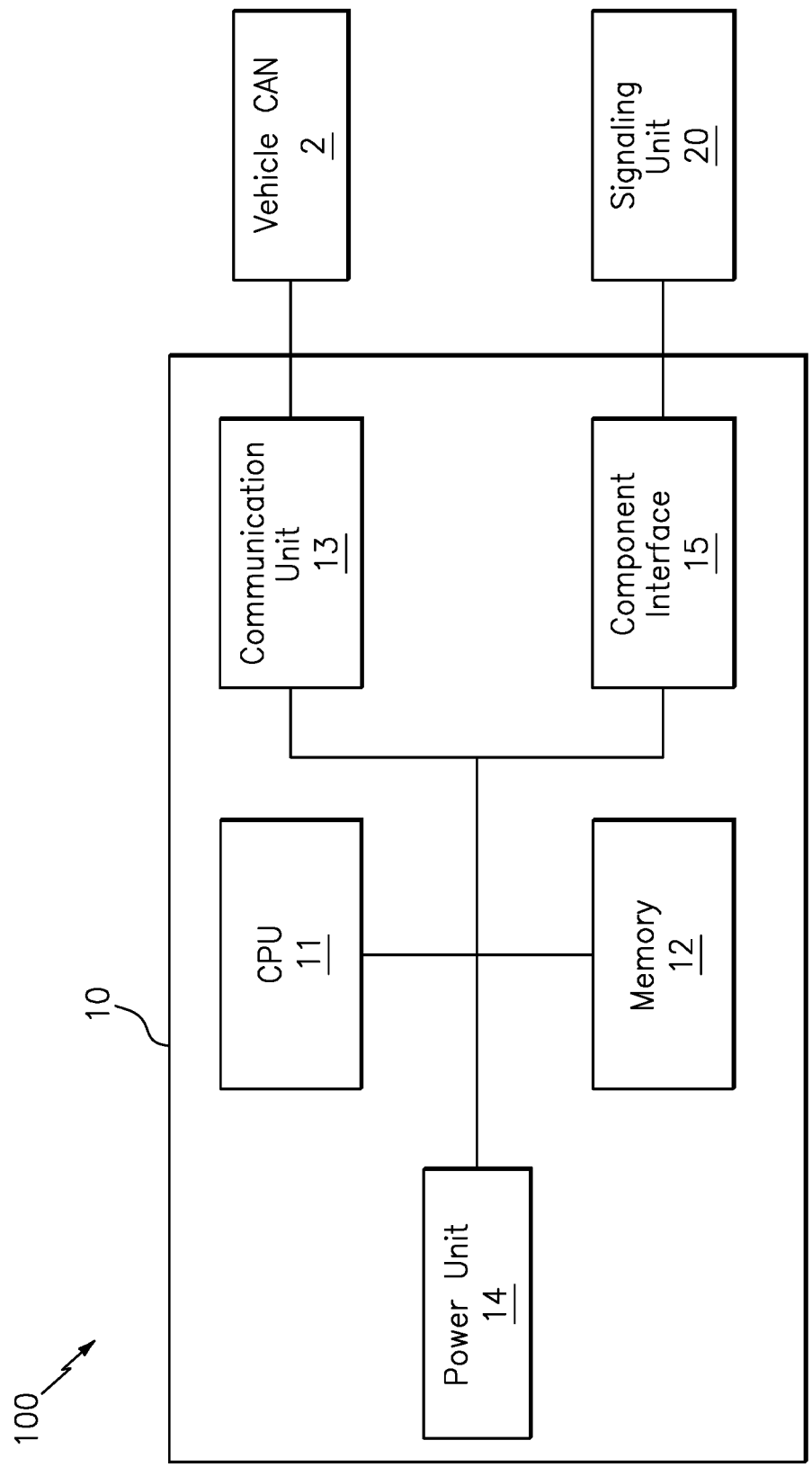
FIG. 1 is a simplified block diagram of the vehicular control mode signaling system, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, the term "active control mode" and derivatives thereof shall refer to the automation status/level of computer based control that is augmenting a human driver and/or assuming full control of a vehicle at any given time. In the preferred embodiment, an active control mode level can be defined by a standardized set of nomenclature which may be formed by the automobile industry and/or various government agencies so as to be universally recognized. One suitable nonlimiting example can include the 5-level automation nomenclature provided by the National Highway Traffic Safety Administration, as shown in Table 1.

TABLE 1

| Level | Status | Description |
|---|---|---|
| 0 | No-Automation | The driver is in complete and sole control of the primary vehicle controls - brake, steering, throttle, and motive power - at all times. |
| 1 | Function-specific Automation | Automation at this level involves one or more specific control functions. Examples include electronic stability control or pre-charged brakes, where the vehicle automatically assists with braking to enable the driver to regain control of the vehicle or stop faster than possible by acting alone. |
| 2 | Combined Function Automation | This level involves automation of at least two primary control functions designed to work in unison to relieve the driver of control of those functions. An example of combined functions enabling a Level 2 system is adaptive cruise control in combination with lane centering. |
| 3 | Limited Self-Driving Automation | Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time. |
| 4 | Full Self-Driving Automation | The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles. |

Figure 2:
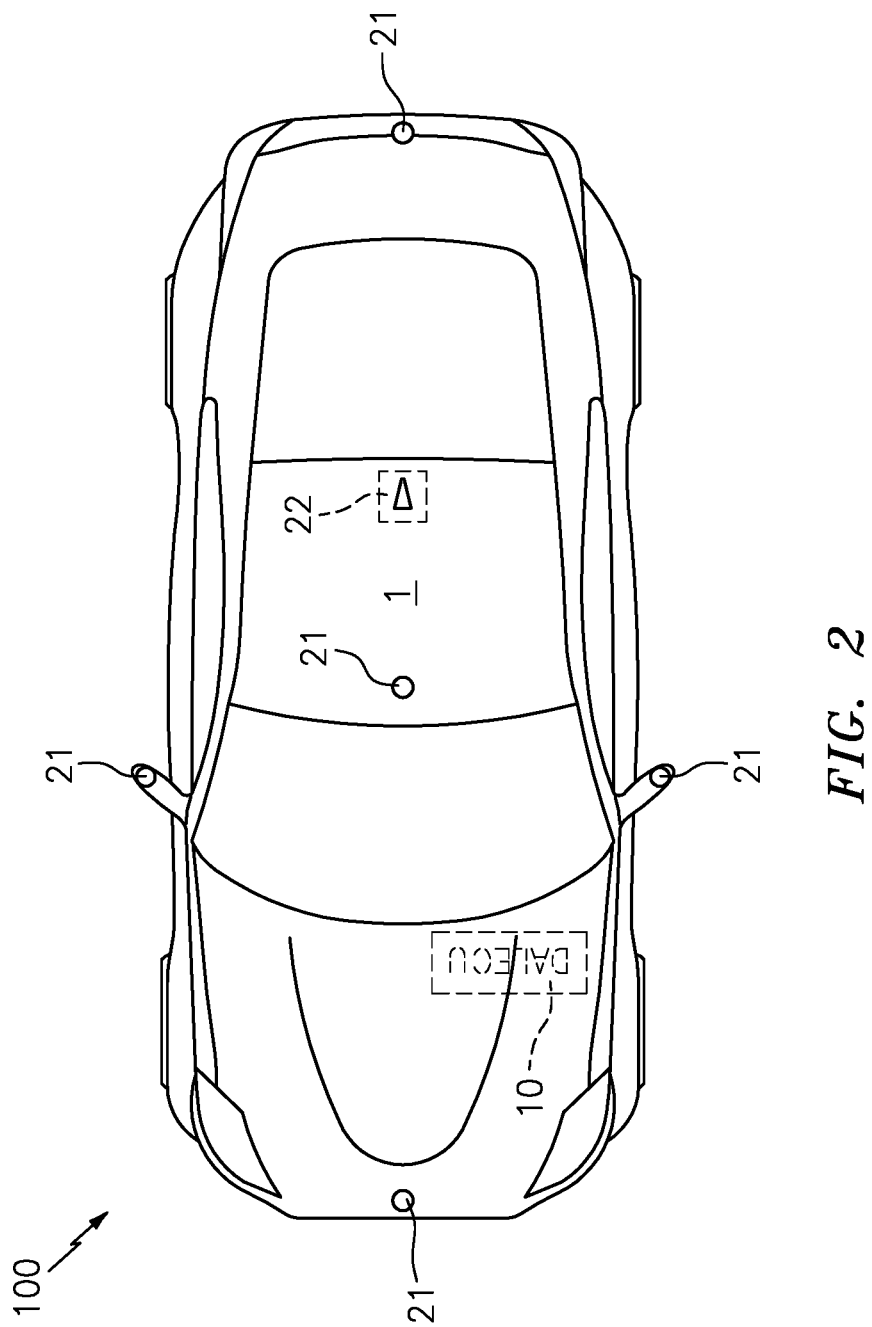
FIG. 2 is a perspective view of the vehicular control mode signaling system in operation on a vehicle, in accordance with one embodiment of the invention.
Figure 3:
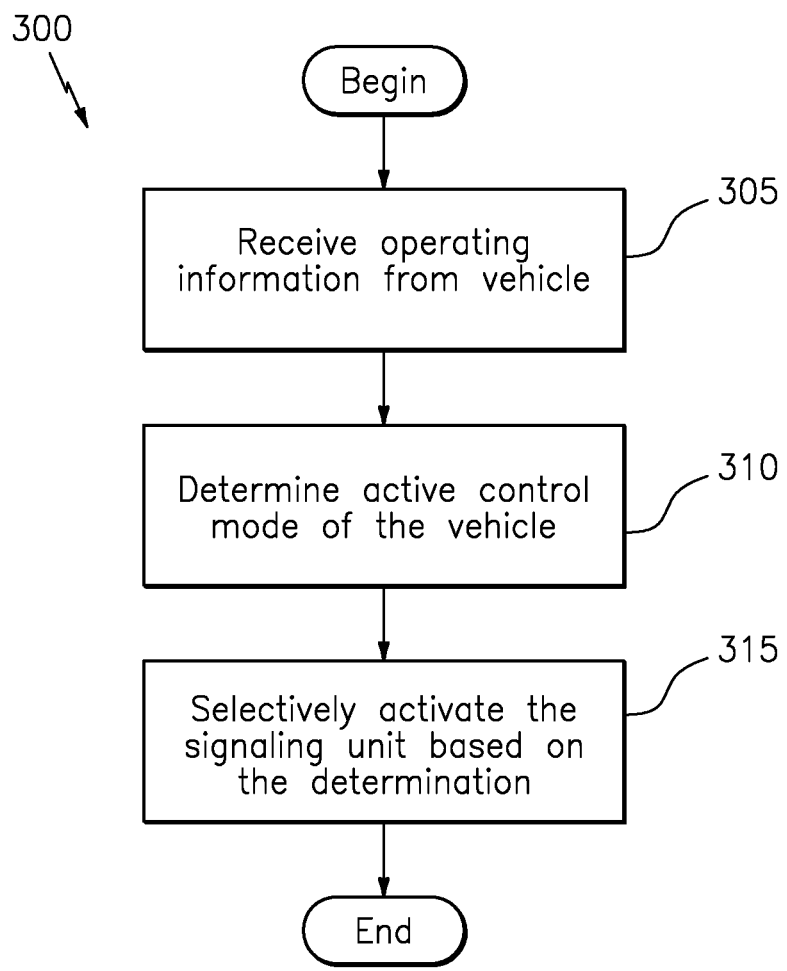
FIG. 3 is a flowchart illustrating a method for providing a notification regarding the active control mode of a vehicle, utilizing the system of FIGS. 1 and 2.

FIGS. 1-3 illustrate one embodiment of a vehicular control mode signaling system 100 that is useful for understanding the inventive concepts disclosed herein. As will be described below, the system can be configured to provide a visual and/or electronic notification regarding the active control mode of a vehicle.

FIG. 1 is a simplistic block diagram of the system 100 that includes a Driving Automation Level Electronic Control Unit (DALECU) 10, and a signaling unit 20. As shown, the DALECU 10 can include, a main body having a processor 11 that is conventionally connected to an internal memory 12, a vehicle communication unit 13, a power unit 14, and/or a component interface unit 15.

Although illustrated as separate elements, those of skill in the art will recognize that one or more system components may comprise, or include one or more printed circuit boards (PCB) containing any number of integrated circuit or circuits for completing the activities described herein. The CPU may be one or more integrated circuits having firmware for causing the circuitry to complete the activities described herein. Of course, any number of other analog and/or digital components capable of performing the below described functionality can be provided in place of, or in conjunction with the below described controller elements.

The main body can include any number of different shapes and sizes, and can be constructed from any number of different materials suitable for encompassing each of the controller elements. In one preferred embodiment, the main body can be constructed from lightweight injection molded plastic having a plurality of internal connectors for securely housing each of the device elements. Of course, any number of other known construction materials such as PVC and composites, for example, are also contemplated. The main body can be secured at any desirable location within or along the vehicle, and can preferably be positioned at or adjacent to the vehicle's automated control system.

The processor/CPU 11 can act to execute program code stored in the memory 12, in order to allow the device to perform the functionality described herein. Memory 12 can act to store operating instructions in the form of program code for the processor 11 to execute. Although illustrated in FIG. 1 as a single component, memory 12 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example, containing programs that permit the processor to perform the mode signaling methods described below. Additionally, memory 12 can also include one or more cache memories that provide temporary storage of at least some program code in order to reduce the number of times program code must be retrieved from the bulk storage device during execution. Each of these devices are well known in the art.

The vehicle communication unit 13 can include any number of components capable of communicating with a vehicle 1, either directly or over a network. In the preferred embodiment, the communication unit can include or comprise a Controller Area Network (CAN) Bus transceiver capable of providing two way communication with the vehicle CAN 2. Moreover, other embodiments are contemplated wherein the vehicle communication unit includes functionality for communicating directly with other portions of the vehicle, such as the vehicles automated control system, that performs one or more automated functions within the vehicle.

In either instance, the vehicle communication unit 13 can function to receive information from one or more of the vehicle systems so as to allow the device 10 to determine and/or recognize the active control mode of the vehicle at all times. As will be described below, upon receiving such information, the DALECU 10 can selectively activate the signaling unit 20 to provide a notification regarding the same.

The power unit 14 can include any number of different components capable of providing the necessary power requirements to each element of the signaling system. To this end, the power unit can include or comprise any number of different batteries and/or can include an electrical power transformer and/or cord capable of allowing the signaling system to be powered by the vehicle's onboard electrical system.

The component interface unit 15 can function to provide a communicative link between the DALECU 10 and the signaling unit 20. In this regard, the component interface unit can include any number of different elements such as one or more wireless transceivers, one or more PIC microcontrollers, internal buses, USB connections and other such components. Of course any other means for providing the two way communication between the DALECU and the signaling unit are also contemplated.

As noted above, the signaling unit 20 is designed to provide a clear notification regarding the active control mode of the vehicle at all times. In various embodiments, this can be performed visually and/or via electronic broadcast.

As shown in FIG. 2, one embodiment of the signaling unit can include any number of signal lights 21 which can be positioned along the vehicle 1 in order to provide a clear visual indication of the active control mode of the vehicle. As described herein, each of the signal lights can preferably include or comprise light emitting diodes (LED), for example, capable of generating continuous and/or bursts of light in any number of different colors, intensities and/or durations, as determined by the DALECU. Of course the lighting units are not limited to the use of LED's, as any type and number of light producing element(s) can be utilized herein. Several nonlimiting examples include compact fluorescent, incandescent, and/or halogen, for example.

Although described with regard to lighting elements, those of skill in the art will recognize that any type of device capable of providing a visual indication regarding the control mode of the vehicle can be utilized herein. Moreover, although shown at particular locations along the vehicle, this is for illustrative purposes only, as each of the signal lights can be positioned at any location along and/or within the vehicle body, so as to provide a clear visual indication to others viewing the vehicle from any angle. Further, the signal lights can be constructed as discrete components which can be secured to an existing vehicle, or can be integrated into the new construction of a vehicle, so as to be an OEM component.

In another embodiment, the signaling unit can include a transmitter 22, which can function to electronically broadcast the vehicles active control mode to an outside device such as an automated stoplight, a highway monitoring system and/or an intelligent traffic routing and reporting system, for example.

In the preferred embodiment, the transmitter 22 can include a variable radio wave transmitter having a unique radio frequency chip capable of transmitting a plurality of independent radio frequencies, which are stored in the memory 12. Of course, the transmitter is not limited to the use of a radio transmitter, as any number of other devices and/or transmission methodologies can also be utilized herein. Several nonlimiting examples can include free-space optical encoding and/or sonic/ultrasound encoding, for example.

FIG. 3 is a flow chart illustrating a nonlimiting exemplary method 300 for providing a notification regarding the active control mode of a vehicle, utilizing the vehicular control mode signaling system 100 described above.

The method can begin at step 305 where the communication unit 13 of DALECU 10 can communicate with the vehicle system 2 in order to receive operating information about the vehicle. As described herein, "operating information" can include any and all information which can be electronically gathered by one or more of the vehicles' computer systems. Several nonlimiting examples can include, but are not limited to 1) trip information such as vehicle speed, fuel status, warning indicators, etc.; and 2) automation systems such as cruise control, electronic stability control, pre-charged brakes, lane departure systems, etc.

Next, the method can proceed to step 310, wherein the processor 11 can compare the received operating information with a set of standardized automation nomenclature such as that described in Table 1, for example, which can be stored in the memory 12, in order to determine an active control mode of the vehicle. Alternatively, it is contemplated that the vehicle system itself can determine the active control mode of the vehicle in a similar manner and can report the same to the DALECU 10, thereby eliminating the need for the system 100 to perform the analysis.

In either instance, once the active control mode of the vehicle has been determined, the method can proceed to step 315, wherein the processor can instruct the signaling unit to activate one or more of the signal lights 21 and/or the signal transmitter 22. In the preferred embodiment, the signal lights 21 will be activated in conformity with a (yet to be established) industry standardized set of nomenclature wherein a particular color (e.g., green, orange) and/or activity (e.g., flashing), for example, represents one of the standardized automation levels.

For example, if the active control mode is determined to be at level 0, the signal lights 21 may remain off, for example, thereby indicating that a human driver is in full control of the vehicle.

If the active control mode is determined to be at levels 1 or 2, the signal lights 21 may be activated to display a continuous orange light, for example, so as to warn others that some aspects of automation are active, but that the human driver remains in control.

If the active control mode is determined to be at level 3, the signal lights 21 may be activated to display a continuous green light, for example, so as to warn others that the vehicle is operating primarily in an automated mode where the human driver's reaction time may be significantly delayed.

If the active control mode is determined to be at level 4, the signal lights 21 may be activated to display a flashing green light, for example, so as to warn others that the vehicle is operating entirely in an automated mode, without the aid of a human driver.

In various embodiments, the system may also transmit the active control mode of the vehicle, which may be received by any number of external devices, as described above. Moreover, the system 100 can be encoded with instructions for ordering the transmitter 22 to send all or a portion of the vehicles operating information when transmitting the active control mode. Such information may be utilized by external system such as automated traffic routing devices, so as to direct the vehicles automated systems into specific lanes of travel in order to prioritize traffic on the roadway, for example.

Of course, the above noted examples are purely illustrative in nature, as the system can function to generate any type of visual indication based on any desirable occurrence. To this end, the system can also function to selectively activate the signal lights and/or transmitter to notify others that the vehicle is transitioning between one of the above noted levels and/or to notify others when the vehicle is coming to a stop, either autonomously or due to the instructions of the driver.

To this end, the above described vehicular control mode signaling system can provide a visual and/or electronic notification regarding virtually any operation of autonomous system components within a vehicle at all times in a novel manner.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A vehicular control mode signaling system, comprising:
   a signaling unit that is disposed along a vehicle; and
   a discrete driving automation level electronic control unit that includes:
      a vehicle communication unit that is configured to engage an onboard computer system of the vehicle and to receive a vehicle operating information therefrom,
      a component interface unit that is communicatively linked to the signaling unit,
      a processor for controlling an operation of the control unit, and
      a memory that is encoded with instructions for instructing the processor to determine an active control mode of the vehicle, and to selectively activate the signaling unit based on the determined active control mode,
   wherein the active control mode includes at least one of a full self-driving automation status, a limited self-driving automation status, a combined function automation status, a function-specific automation status, and a no-automation status.

2. The system of claim 1, wherein the signaling unit includes at least one signal light that is disposed along the vehicle.

3. The system of claim 2, wherein the signal light is configured to illuminate a different color for each of the determined active control modes.

4. The system of claim 1, wherein the signaling unit includes a plurality of signal lights that are disposed along a front end, a back end, a top end, a driver side, and a passenger side of the vehicle.

5. The system of claim 4, wherein the memory is encoded with instructions for ordering the transmitter to also broadcast a portion of the received vehicle operating information to an outside device.

6. The system of claim 1, wherein the signaling unit includes a transmitter that is configured to electronically broadcast the active control mode of the vehicle to an outside device.

7. The system of claim 1, wherein the vehicle communication unit comprises:
   a controller area network bus transceiver.

8. The system of claim 1, wherein the vehicle operating information includes, at least one of a vehicle speed, a fuel status, a warning indicator, and an automation systems status.

9. The system of claim 1, wherein the vehicle operating information consists of:
   a vehicle speed, a fuel status, a warning indicator, and an automation systems status.

10. A computer-implemented method for providing a notification of active control mode of a vehicle, comprising:
    providing a discrete driving automation level electronic control unit:
    communicating with an onboard computer system of a vehicle;
    receiving operating information about the vehicle;
    storing a plurality of active control mode levels within a memory of the electronic control unit;
    comparing, via a processor within the electronic control unit, the received operating information with the stored active control mode levels;
    determining an active control mode level of the vehicle based on the comparing step; and
    selectively activating a signaling unit to illuminate a specific color representing the determined active control mode,
    wherein the active control mode includes at least one of a full self-driving automation status, a limited self-driving automation status, a combined function automation status, a function-specific automation status, and a no-automation status.

11. The method of claim 10, wherein selectively activating the signaling unit includes:
    instructing a signal light to transition between an on and off configuration.

12. The method of claim 10, wherein selectively activating the signaling unit includes:
    instructing a transmitter to send an electronic signal containing the active control mode to an outside device.

13. The method of claim 10, wherein selectively activating the signaling unit includes:
    instructing a transmitter to send an electronic signal containing a portion of the received operating information to an outside device.

14. The method of claim 10, wherein the vehicle operating information includes, at least one of a vehicle speed, a fuel status, a warning indicator, and an automation systems status.

\* \* \* \* \*